LOGIC CIRCUIT UTILIZING A LATCH TYPE SWITCHING DEVICE AS A PERMANENT MEMORY ELEMENT

Filed March 6, 1963 2 Sheets-Sheet 1

INVENTOR:
EARL R. BULLOCK,
BY David M. Schiller
ATTORNEY.

INVENTOR:
EARL R. BULLOCK,
BY David M. Schiller
ATTORNEY.

United States Patent Office 3,158,761
Patented Nov. 24, 1964

3,158,761

LOGIC CIRCUIT UTILIZING A LATCH TYPE SWITCHING DEVICE AS A PERMANENT MEMORY ELEMENT

Earl R. Bullock, Palos Verdes Estates, Calif., assignor to General Electric Company, a corporation of New York Filed Mar. 6, 1963, Ser. No. 263,170
13 Claims. (Cl. 307—88.5)

This invention relates to electrical control circuits and has particular relation to logic circuits which exhibit a Permanent Memory.

Many logic circuits heretofore designed have been provided with a Memory function which, as the name implies, is a unit which remembers which of various signal inputs conditions last existed in its input circuit. Such units are usually capable of being switched between two stable electrical output conditions corresponding to different input signals and of remaining in the prevailing output condition whenever the input signals are removed. In Memory circuits employing transistors or other electronic valves, it is found that the ability of the circuit to remember depends upon the state of conductivity of the valve, this state depending in turn on the availability of power. Consequently, in the event of power failure, the valves all revert to a nonconductive condition. Upon restoration of power the Memory of such circuits is at best ambiguous. It is said that the circuits have no Permanent Memory.

In many applications it is desirable to provide a so-called Permanent Memory unit which is capable of remembering its last input condition even in the event of total loss and subsequent restoration of power. In the design of Permanent Memory units it is desirable that such units be of rugged and low cost construction, and that the components employed to provide the Permanent Memory function not be required to carry appreciable current during operation of the circuit. It is also very desirable that the components of the Permanent Memory unit be arranged so that they do not tend to slow down the operation of the electronic valves. Permanent Memory units of previous design have failed to incorporate one or more of the above desirable features.

It is therefore a general object of the present invention to provide a novel Memory circuit employing electronic valves and having a reliable Permanent Memory which causes the circuit to assume the same conductive condition it had prior to a power interruption after restoration of power.

It is another object of the invention to provide a novel and improved Memory circuit employing electronic valves and having a Permanent Memory function provided by a rugged and low cost switch associated with the valves to control bias circuits therefor.

It is a further object of the invention to provide a novel and improved transistorized Permanent Memory circuit which has a very rapid response to input signals, which is of rugged and low cost construction, and which does not tend to slow down operation of the transistors.

In carrying out the invention in one form a Memory circuit is provided having a pair of electronic valves connected to be supplied from a pair of power terminals and cross-connected to define a bistable circuit so that either of the valves may be in a high conduction state but not both simultaneously. A latch type switch is provided which is transferable between a pair of circuit controlling conditions, the switch including energizable means for transferring the switch between its conditions and which is connected to be energized by currents of opposite polarity depending upon which of the valves is in a high conduction state. The switch is transferred to one or the other of its conditions depending upon the polarity of energization of the energizable means, and due to the latching characteristic, the switch remains in the condition to which it is transferred subsequent to deenergization of the energizable means. In order to control conduction of the valves each valve has associated therewith a bias circuit which is operatable when placed in an effective condition to cause its associated valve to conduct to a greater extent than the other valve in response to application of power to the terminals. The arrangement is such that when a particular valve is last in a high conduction state prior to a power interruption, the switch is placed in one of its two conditions effective to render the bias circuit for such last conducting valve operative to insure that the last conducting valve resumes conduction in response to subsequent application of power to the terminals.

Other objects and advantages of the invention will become apparent from the following description taken in conjunction with the accompanying drawings in which.

Figure 1:
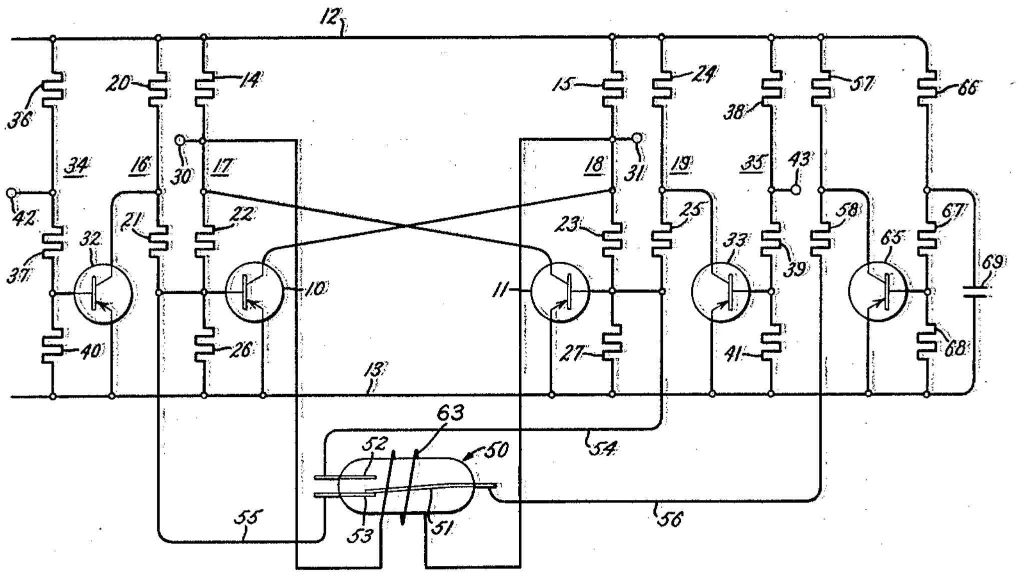
FIG. 1 is a schematic representation showing a Permanent Memory logic circuit constructed in accordance with the invention.

Referring now to the drawings there is illustrated in FIG. 1 a Permanent Memory circuit constructed according to the present invention. The circuit there shown includes a pair of electronic valves 10 and 11 illustrated in the form of transistors connected across a source of direct current potential represented by power leads 12 and 13 through load resistors 14 and 15. The lead 12 is the more negative of the two leads having, for example, a voltage of the order of minus twelve volts applied thereto whereas the power lead 13 may be at zero potential. Each of the transistors 10 and 11 is adapted to be operated as a switch to gate current to its respective load impedance, and for this purpose it will be assumed that a transistor is "on" when it operates as a low impedance device and is "off" when it switches to a high impedance condition.

In the illustrated embodiment each of the transistors 10 and 11 includes a pair of parallel connected base channels connected between the bases of the transistors and the power lead 12. The base channels 16 and 17 for transistor 10 include respectively series connected resistors 20 and 21 and series connected resistors 14 and 22 whereas the base channels 18 and 19 for transistor 11 include respectively series connected resistors 15 and 23 and series connected resistors 24 and 25. Resistors 26 and 27 are connected respectively to the bases of transistors 10 and 11 and to the power lead 13. The transistors 10 and 11 are cross-connected in a manner so that either of the transistors may assume a high conduction state but not both simultaneously. For this purpose the collector electrode of the transistor 10 is connected to the base channel 18 of the transistor 11 at a point between the resistors 15 and 23, and in a like manner the collector of the transistor 11 is connected to the base channel 17 of the transistor 10 at a point between resistors 14 and 22. To illustrate that only one of the transistors can be highly conducting at any given time, let it be assumed that the transistor 10 is in a high conduction state. For this condition then transistor 10 is in a low impedance condition so that the point of connection of the collector of transistor 10 to the base channel 18 is essentially at zero potential which prevents the flow of base current to the base of transistor 11 whereby the transistor 11 is nonconducting. In a similar manner when transistor 11 is in a high conduction state, its cross connection to the base channel 17 prevents transistor 10 from conducting. Output terminals 30 and 31 are connected respectively to points between the resistors 14 and 22 of base channel 17 and between resistors 15 and 23 of base channel 18.

In order to control conduction of transistors 10 and 11 a pair of control valves 32 and 33 shown in the form of transistors are connected respectively to the base channels 16 and 19 so as to prevent conduction of the associated one of the transistors 10 and 11 when a selected one of the transistors 32 and 33 is conducting. For this purpose the collectors of the transistors 32 and 33 are connected respectively to points between the resistors 20 and 21 and between resistors 24 and 25, the emitters of transistors 32 and 33 being connected to the power lead 13. It is thus seen that when either one of the transistors 32 and 33 is in a conducting state, the point of connection of its collector to the associated base channel 16 or 19 is essentially at zero potential whereby the associated transistor 10 or 11 is rendered nonconducting. The control transistors 32 and 33 are provided respectively with base channels 34 and 35 including respectively series connected resistors 36 and 37 and series connected resistors 38 and 39. Resistors 40 and 41 are connected respectively to the bases of transistors 32 and 33 and to the power lead 13. The transistors 32 and 33 preferably have cross connections (not shown) in the manner of the transistors 10 and 11.

In order to control conduction of control transistors 32 and 33 to thereby control conduction of transistors 10 and 11, a pair of input terminals 42 and 43 are provided which are connected respectively to the base channels 34 and 35 at points intermediate the resistors 36 and 37 and the resistors 38 and 39. As will presently appear, a signal input may be furnished to either one of the terminals 42 and 43 by connecting the input terminal to the power lead 13 as by a suitable switching arrangement. To illustrate the operation of the circuit let it be assumed that the transistor 10 is conducting so that an output signal is appearing at terminal 31. For this condition then the transistor 11 is nonconducting due to its cross connection with transistor 10, the transistor 32 is nonconducting, and the transistor 33 is conducting. If a signal is now applied to input terminal 43, such as by shorting this terminal to the power lead 13, base current for the transistor 33 can no longer flow through the base channel 35 with the result that transistor 33 is rendered nonconducting. As a result, the point of connection of the collector of transistor 33 to the base channel 19 assumes a negative potential thereby allowing base current to flow from transistor 11 through base channel 19 which renders transistor 11 conductive. When this occurs, the point of connection of the collector of transistor 11 to the base channel 17 is essentially at zero potential which causes transistor 10 to become nonconducting. This circuit condition will be maintained until an input signal is applied to the input terminal 42 at which time the conducting conditions of transistors 10 and 11 will be reversed.

In the event that power applied to the leads 12 and 13 is interrupted for some reason, it can be appreciated that the conducting one of the transistors 10 and 11 would be rendered nonconductive. In many applications it is very desirable to provide the circuit with a so-called Permanent Memory characteristic so that upon restoration of power to the leads 12 and 13 the circuit will assume the same conducting mode which it had prior to the power interruption. That is, if the transistor 10 were conducting just prior to the power interruption, provision should be made for steering the transistor 10 into a conducting condition in response to subsequent application of power. In accordance with the present invention a Permanent Memory characteristic is provided by means including a pair of bias circuits for the transistors 10 and 11 each of which is operatable when placed in an effective condition to cause conduction of its associated transistor to a greater extent than the other transistor in response to application of power to the leads 12 and 13. The bias circuits are placed in an effective condition selectively under control of a latch type switch which in turn is controlled by the conductive conditions of the transistors 10 and 11. The arrangement is such that the switch assumes a condition effective to place a selected one of the bias circuits in an effective condition in response to conduction of the transistor associated with the selected bias circuit just prior to a power interruption. With this arrangement the transistor which was conducting just prior to a power interruption resumes conduction after power is subsequently restored.

In the embodiment of FIG. 1 a latch type double throw switch 50 is provided to control establishment and interruption of a pair of bias circuits associated with the transistors 10 and 11. For this purpose the switch 50 includes a movable contact 51 movable between a pair of spaced fixed contacts 52 and 53 to which are connected respectively conductors 54 and 55 leading to the bases of the transistors 11 and 10 respectively and forming part of the biasing circuits. The movable contact 51 is connected to a conductor 56 which is connected to the power lead 12 through series connected resistors 57 and 58, this latter circuit comprising a common part of the two biasing circuits. The switch 50 utilized in the present invention is preferably the latch type double throw magnetic reed switch disclosed and claimed in application S.N. 273,772 filed April 17, 1963 by Everett W. Werts and assigned to the assignee of the present invention, the basic double throw switch being disclosed and claimed in application S.N. 190,274 filed April 26, 1962 by Everett W. Werts, now Patent No. 3,117,202, and also assigned to the assignee of the present invention.

Figure 2:
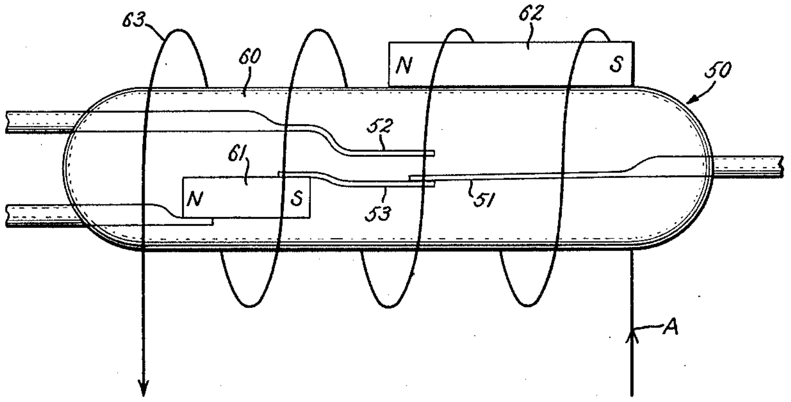
FIG. 2 is a view in elevation showing a latch type double throw switch employed in the circuit of FIG. 1.

The latch type switch disclosed and claimed in the former of the two above mentioned applications is illustrated in FIG. 2 and briefly consists of a deflectable reed and two fixed electrodes constituting respectively the movable and fixed contacts 51, 52 and 53. The reed and fixed contacts are supported by a sealed tube 60 and are formed of electrically and magnetically conductive material. The fixed contact 53 supports a permanent magnet 61 within the tube which attracts the reed 51 towards the fixed contact 53, and an additional permanent magnet 62 is located outside the tube on the external surface thereof to attract the reed 51 towards the fixed contact 52. The inductions of the magnets 61 and 62 are set so that when the reed 51 is moved into engagement with either of the fixed contacts by application of an external magnetic field, it remains in such position after removal of the external magnetic field. The external field is preferably provided by means of a winding 63 which surrounds the tube 60. When the winding 63 is energized by current flowing in the direction indicated by the arrow A with the reed engaging the fixed contact 53 as shown, magnetic flux is established which causes the reed 51 to move from its illustrated position into engagement with the fixed contact 52 with a snap action. When the winding 63 is deenergized, the permanent magnet 62 holds the reed 51 in engagement with the fixed contact 52. Energization of winding 63 in the opposite direction establishes magnetic flux which causes reed 51 to move out of engagement with contact 52 and into engagement with contact 53 with a snap action. Deenergization of winding 63 results in the reed 51 remaining in engagement with contact 53 by flux produced by magnet 61.

In the present invention, the winding 63 is connected to be energized by currents of opposite polarity depending upon which of the transistors 10 and 11 is conducting. For this purpose the winding 63 is connected between the output terminals 30 and 31 as shown in FIG. 1 so that when transistor 10 is conducting, winding 63 is energized by current flowing from right to left as viewed in FIG. 1 or in the direction opposite to the direction indicated by the arrow A in FIG. 2, and when transistor 11 is conducting, winding 63 is energized by current flowing from left to right as viewed in FIG. 1 or in the direction indicated by the arrow A in FIG. 2. The arrangement is such that when transistor 10 is conducting, energization of winding 63 causes reed 51 to engage contact 53 thereby establishing the biasing circuit for transistor 10. In a similar manner, when transistor 11 is conducting, winding 63 is energized to move the reed 51 into engagement with contact 52 to thereby establish the biasing circuit for transistor 11.

To illustrate the operation of the Permanent Memory circuit, let it be assumed that transistor 10 is in a high conducting condition so that its biasing circuit including conductor 55, conductor 56 and the resistors 57 and 58 is established through the closed contacts 51 and 53 of switch 50. In the event of a power interruption all transistors and the winding 63 will be deenergized, but due to the latching characteristic of switch 50, the reed 51 will remain in engagement with contact 53 to continue the establishment of the biasing circuit for transistor 10. When power is subsequently restored to leads 12 and 13, both transistors 10 and 11 will make an effort to begin conduction, but due to the additional biasing circuit established by the switch 50 the transistor 10 will receive more base current than the transistor 11 and will therefore conduct to a greater extent than transistor 11. As soon as transistor 10 conducts more than transistor 11, transistor 11 will start to cut off due to the cross connection between its base channel 18 and the collector of transistor 10. It should also be pointed out that the presence of the winding 63 in the circuit considerably improves the switching action of the transistors 10 and 11. This can be explained by considering the fact that when one of the transistors, such as transistor 11, is turned on by an input signal, the current flowing through the winding from the previously conducting transistor 10 cannot reverse immediately due to the winding inductance. The result is that the right hand terminal of the winding initially assumes a high negative potential until the winding current can reverse and additional base current is thereby supplied to the transistor 11 as it is turning on.

In the present invention means are provided to effectively disconnect the biasing circuits and the switch 50 from the circuit a predetermined time after application of power to the leads 12 and 13. With this arrangement the disconnected parts are not called upon to carry appreciable current during normal operation of the circuit and therefore cannot appreciably limit the speed of operation of the circuit transistors. To accomplish this a transistor 65 is provided having its emitter and collector connected between the lead 13 and a point intermediate the resistors 57 and 58, the base of transistor 65 being connected to the lead 12 through series connected resistors 66 and 67, and being connected to the lead 13 through a resistor 68. A capacitor 69 is connected between lead 13 and a point intermediate resistors 66 and 67. When power is applied to the leads 12 and 13, transistor 65 is prevented from conducting until capacitor 69 has been charged through resistor 66 to an extent sufficient to cause the flow of base current through transistor 65. In a particular circuit tested conduction of transistor 65 occurred approximately fifty milliseconds after application of power resulting in connection of the point between resistors 57 and 58 to the lead 13. The test also showed that during normal operation of the circuit the contacts of the reed switch make a maximum of one hundred microamperes of resistive load at twenty two one hundredths volts and break much less than this. When power is applied to the circuit following a power interruption, the contacts carry only about two milliamperes and are not called upon to break this.

Figure 3:
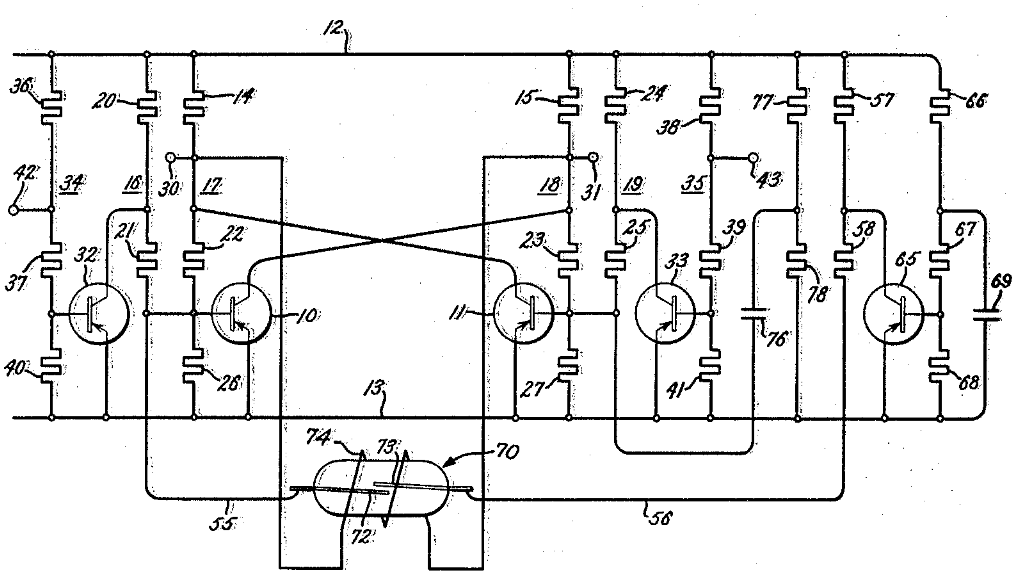
FIG. 3 is a schematic representation showing a Permanent Memory logic circuit of different arrangement than the circuit of FIG. 1.

Referring now to FIG. 3 there is illustrated a Permanent Memory circuit of different arrangement than the circuit of FIG. 1. The essential difference between the circuits of FIGS. 1 and 3 is that in the circuit of FIG. 3 a single throw switch is employed to establish and interrupt a biasing circuit for one of the transistors, the other transistor including a permanently established biasing circuit containing a capacitor. Components of the circuits of FIGS. 1 and 3 which are similar are represented by the same reference numerals.

Figure 4:
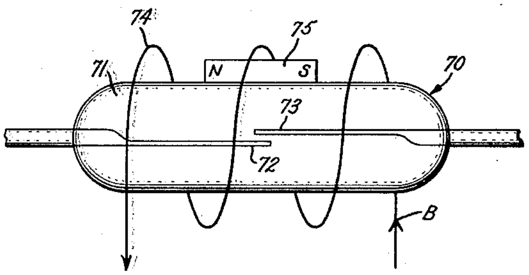
FIG. 4 is a view in elevation showing a latch type single throw switch utilized in the circuit of FIG. 3.

In the circuit of FIG. 3 a latch type single throw switch 70 is employed which is preferably of the magnetic reed type and which is illustrated in detail in FIG. 4. As shown in FIG. 4 the switch 70 includes a sealed tube 71 which supports and contains a pair of flexible magnetically and electrically conductive reeds 72 and 73 which overlap transversely of the tube. The contacts 72 and 73 are shown open and are attracted into engagement in response to energization of a winding 74 surrounding the tube by current flowing in the direction of the arrow B of FIG. 4. A permanent magnet 75 is located adjacent the contacts and is provided with induction sufficient so as to maintain the contacts 72 and 73 in engagement after the winding 74 has been energized, the induction of magnet 75 being insufficient by itself to effect closure of the contacts. The magnet 75 is poled so that its flux flows through the contacts 72 and 73 in the same direction as flux produced by energization of winding 74 in the direction of the arrow B. In order to open the contacts 72 and 73 it is necessary to energize the winding by current flowing in a direction opposite to the direction of the arrow B so that the winding flux opposes the magnet flux in the contacts.

The biasing circuit for transistor 10 includes the conductor 55 connected between the base of transistor 10 and the contact 72, the switch contacts 72 and 73, and the conductor 56 and series connected resistors 57 and 58. The biasing circuit for the transistor 11 consists of the series connection of a capacitor 76 and a resistor 77 connected to the base of transistor 11 and to the lead 12. A resistor 78 is connected between a point intermediate the capacitor 76 and resistor 77 and the lead 13. As in the case of the circuit of FIG. 1, the two biasing circuits for the transistors 10 and 11 each operate when placed in an effective condition to cause conduction of its associated transistor to a greater extent than the other transistor. The biasing circuit for transistor 10 is rendered effective by being established when the contacts 72 and 73 of the switch 70 are in engagement, and the biasing circuit for transistor 11 is rendered effective when the contacts of switch 70 are open. The winding 74 for switch 70 is connected between the output terminals 30 and 31 in the manner of the corresponding winding 63 in the circuit of FIG. 1.

To describe the operation of the circuit of FIG. 3 let it be assumed that transistor 10 is conducting so that current through the winding 74 flows from right to left as viewed in FIG. 3 or in the direction of the arrow B in FIG. 4. For such direction of energization of the winding 74 the contacts 72 and 73 are closed to establish the biasing circuit for transistor 10. In the event of a power interruption all transistors and the winding 74 are deenergized, but the switch contacts 72 and 73 remain closed due to the latching characteristic afforded by the permanent magnet 75 to maintain establishment of the biasing circuit for transistor 10. When power is subsequently restored the transistor 10 begins to conduct by reason of the additional base current supplied thereto through its established biasing circuit. At the same time, transistor 11 also begins to conduct since the base capacitor 76 is initially drawing substantial base current. Prior to the time that transistor 65 is rendered conducting, capacitor 76 becomes charged with the result that transistor 11 is rendered nonconducting while transistor 10 assumes a high conduction state. At a predetermined time after capacitor 76 is charged, capacitor 69 is charged which renders transistor 65 conducting to effectively disconnect the switch 70 and the biasing circuit for transistor 10 from the circuit. If it be assumed that the transistor 11 is conducting, then current flows through the winding 74 from left to right as viewed in FIG. 3 which is opposite to the direction indicated by arrow B in FIG. 4 with the result that the contacts 72 and 73 are opened to thereby interrupt the biasing circuit for transistor 10. If a power interuption occurs, the switch contacts 72 and 73 remain open due to the switch latching characteristic. When power is subsequently restored, the biasing circuit for transistor 11 is rendered effective and provides additional base current for transistor 11 than that provided by the base channels 16 and 17 for transistor 10 with the result that transistor 11 assumes a fully conducting condition.

Figure 5:
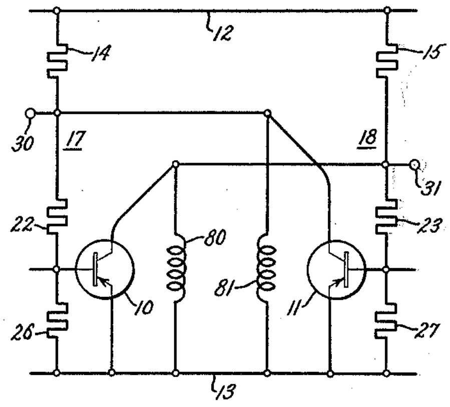
FIG. 5 is a schematic representation showing a portion of a Permanent Memory logic circuit employing a different switch actuating means than that shown in FIGS. 1 and 3.

In the circuits of FIGS. 1 and 3 the switches 50 and 70 have associated therewith respectively the single windings 63 and 74. In certain applications it may be desirable to provide a double winding arrangement such as that illustrated in FIG. 5 which shows a portion of the bistable circuit having parts which are similar to parts in the circuits of FIGS. 1 and 3, these similar parts being represented by the same reference numerals. In the circuit of FIG. 5 two windings 80 and 81 are employed instead of either the single winding 63 of FIG. 1 or the single winding 74 of FIG. 3, one of the windings 80 and 81 serving when energized to effect closure of either one set of contacts of switch 50 or the contacts 72 and 73 of switch 70, and the other winding serving when energized to close the other set of contacts of switch 50 or to open the contacts of switch 70. The winding 80 is connected between the collector or transistor 10 and the lead 13 whereas the winding 81 is connected between the collector of transistor 11 and the lead 13.

To describe the operation let it be assumed that transistor 10 is conducting and that transistor 11 is nonconducting. With this condition then winding 81 is energized and winding 80 is deenergized inasmuch as transistor 10 provides essentially a short circuit across winding 80. Energization of winding 81 is effective to establish the biasing circuit for transistor 10 in either the circuit of FIG. 1 or the circuit of FIG. 3. Similarly, if transistor 11 is conducting, winding 80 is energized and is effective to establish the biasing circuit for transistor 11 in the circuit of FIG. 1 or to interrupt the biasing circuit for transistor 10 in the circuit of FIG. 3.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. An electrical circuit shiftable between bistable conditions comprising; a pair of direct current supply terminals, a pair of electronic valves connected to be supplied from said terminals and cross-connected to define a bistable circuit such that either of said valves may be in a high conduction state but not both simultaneously, means for shifting said circuit between its bistable conditions, a switch transferable between a pair of circuit controlling conditions, energizable means for transferring said switch between its conditions connected to be energized by currents of opposite polarity depending upon which of said valves is in a high conduction state, said switch being transferred to one or the other of its conditions depending upon the polarity of energization of said energizable means, said switch having a latching characteristic so that it remains in the condition to which it is transferred subsequent to deenergization of said energizable means, and a pair of bias circuits for said valves each operatable when in an effective condition to cause its associated valve to conduct to a greater extent than the other valve in response to application of power to said terminals, said switch controlling the effective conditions of said bias circuits such that a separate bias circuit is placed in an effective condition for each condition of the switch, said switch being in a condition effective to place a selected bias circuit in an effective condition when the valve associated with the selected bias circuit is last in a high conduction state prior to a power interruption.

2. A circuit as defined in claim 1 wherein said switch comprises a sealed magnetic reed switch, said energizable means comprising a single winding surrounding the reed switch and connected between the output circuits of said valves.

3. A circuit as defined in claim 1 wherein said switch comprises a sealed magnetic reed switch, said energizable means comprising a first winding for the reed switch connected across one of said valves, and a second winding for the reed switch connected across the other of said valves.

4. An electrical circuit shiftable between bistable conditions comprising; a pair of direct current supply terminals, a pair of electronic valves connected to be supplied from said terminals and cross-connected to define a bistable circuit such that either of said valves may be in a high conduction state but not both simultaneously, means for shifting said circuit between its bistable conditions, a switch transferable between a pair of circuit controlling conditions, energizable means for transferring said switch between its conditions connected to be energized by currents of opposite polarity depending upon which of said valves is in a high conduction state, said switch being transferred to one or the other of its conditions depending upon the polarity of energization of said energizable means, said switch having a latching characteristic so that it remains in the condition to which it is transferred subsequent to deenergization of said energizable means, and a pair of bias circuits for said valves each connected to said switch to be established for a separate condition of the switch, each bias circuit being operatable when established to cause the associated valve to conduct to a greater extent than the other valve in response to application of power to said terminals, said switch being in a condition effective to establish a selected bias circuit when the valve associated with the selected circuit is last in a high conduction state prior to a power interruption.

5. A circuit as defined in claim 4 wherein said switch comprises a sealed magnetic reed switch, said energizable means comprising a single winding surrounding the reed switch and connected between the output circuits of said valves.

6. A circuit as defined in claim 4 wherein said switch comprises a sealed magnetic reed switch, said energizable means comprising a first winding for the reed switch connected across one of said valves, and a second winding for the reed switch connected across the other of said valves.

7. An electrical circuit shiftable between bistable conditions comprising; a pair of direct current supply terminals, a pair of transistors each having an emitter, a collector, and a base, said transistors being connected to be supplied from said terminals and cross-connected to define a bistable circuit such that either of said transistors may be in a high conduction state but not both simultaneously, means for shifting said circuit between its bistable conditions, a switch transferable between a pair of circuit controlling conditions, energizable means for transferring said switch between its conditions connected to be energized by currents of opposite polarity depending upon which of said transistors is in a high conduction state, said switch being transferred to one or the other of its conditions depending upon the polarity of energization of said energizable means, said switch having a latching characteristic so that it remains in the condition to which it is transferred subsequent to deenergization of said energizable means, and a pair of bias circuits for said transistors each connected to said switch to be established for a separate condition of the switch, and each connected to the base circuit of the associated transistor and to the more negative one of said terminals each of said bias circuits being operatable when established to cause the associated transistor to conduct to a greater extent than the other transistor in response to application of power to said terminals, a selected bias circuit being established to cause greater conduction of its associated transistor when said switch is in a condition created by the associated transistor being last in a high conduction state prior to a power interruption.

8. A circuit as defined in claim 7 wherein said switch comprises a sealed double throw magnetic reed switch, said energizable means comprising winding means surrounding the reed switch.

9. An electrical circuit shiftable between bistable conditions comprising; a pair of direct current supply terminals, a pair of transistors each having an emitter, a collector, and a base, said transistors being connected to be supplied from said terminals and cross-connected to define a bistable circuit such that either of said transistors may be in a high conduction state but not both simultaneously, means for shifting said circuit between its bistable conditions, a switch transferable between a pair of circuit controlling conditions, energizable means for transferring said switch between its conditions connected to be energized by currents of opposite polarity depending upon which of said transistors is in a high conduction state, said switch being transferred to one or the other of its conditions depending upon the polarity of energization of said energizable means, said switch having a latching characteristic so that it remains in the condition to which it is transferred subsequent to deenergization of said energizable means, and a pair of bias circuits for said transistors each connected to said switch to be established for a separate condition of the switch, and each connected to the base circuit of the associated transistor and to the more negative one of said terminals, each of said bias circuits being operatable when established to cause the associated transistor to conduct to a greater extent than the other transistor in response to application of power to said terminals, a selected bias circuit being established to cause greater conduction of its associated transistor when said switch is in a condition created by the associated transistor being last in a high conduction state prior to a power interruption, and means operable to connect the established one of said bias circuits to the more positive one of said terminals a preselected time after application of power to said terminals.

10. A circuit as defined in claim 9 wherein said last-named means includes an additional transistor connected between a point in the bias circuit controlled by said switch and the more positive one of said terminals, and a capacitor connected to the more positive one of said terminals effective when charged to cause conduction of said additional transistor.

11. An electrical circuit shiftable between bistable conditions comprising; a pair of direct current supply terminals, a pair of transistors each having an emitter, a collector, and a base, said transistors being connected to be supplied from said terminals and cross-connected to define a bistable circuit such that either of said transistors may be in a high conduction state but not both simultaneously, means for shifting said circuit between its bistable conditions, a switch transferable between a pair of circuit controlling conditions, energizable means for transferring said switch between its conditions connected to be energized by currents of opposite polarity depending upon which of said transistors is in a high conduction state, said switch being transferred to one or the other of its conditions depending upon the polarity of energization of said energizable means, said switch having a latching characteristic so that it remains in the condition to which it is transferred subsequent to deenergization of said energizable means, and a pair of bias circuits for said transistors each operatable when in an effective condition to cause its associated transistor to conduct to a greater extent than the other transistor in response to application of power to said terminals, one of said bias circuits being established and interrupted under control of said switch and being connected to the base circuit of one transistor and to the more negative one of said terminals, said one bias circuit being established to cause greater conduction of said one transistor only when said switch is in a condition created by said one transistor being last in a high conduction state prior to a power interruption, the other bias circuit being independent of said switch and being connected to the base circuit of the other transistor and to the more negative one of said terminals, said other bias circuit being effective to cause greater conduction of said other transistor only when said one bias circuit is interrupted, said other bias circuit including a capacitor which when charged prevents conduction of said other transistor.

12. A circuit as defined in claim 11 wherein said switch comprises a sealed single throw magnetic reed switch, said energizable means comprising winding means surrounding the reed switch.

13. An electrical circuit comprising; a pair of direct voltage supply terminals, a pair of transistors each having an emitter, a collector and a base, said transistors being connected to be supplied from said terminals and cross-connected to define a bistable circuit such that either of said transistors may be in a high conduction state but not both simultaneously, a double throw magnetic reed switch including a sealed tube containing a pair of spaced fixed contacts and a movable magnetic contact movable between said fixed contacts, winding means surrounding the tube and effective when energized by current of one polarity for moving the movable contact into engagement with one fixed contact and effective when energized by current of opposite polarity for moving the movable contact into engagement with the other fixed contact, means providing the switch with a Memory so that the movable contact when moved to either of the fixed contacts in response to energization of the winding means remains in such position after the winding means is deenergized, said winding means being connected to be energized by current of said one polarity when one of said transistors is in a high conduction state and to be energized by current of said opposite polarity when the other transistor is in a high conduction state, conductors leading from said one fixed contact to the base of said one transistor and from said other fixed contact to the base of said other transistor, and circuit means leading from said movable contact to the more negative one of said terminals.

No references cited.

JOHN W. HUCKERT, *Primary Examiner.*